Aug. 9, 1949.   G. T. LA BONTE   2,478,587
GRASS EDGING DEVICE

Filed July 21, 1945   2 Sheets-Sheet 1

Inventor

George T. La Bonte

By *Clarence A. O'Brien
and Harvey B. Jacobson*
Attorneys

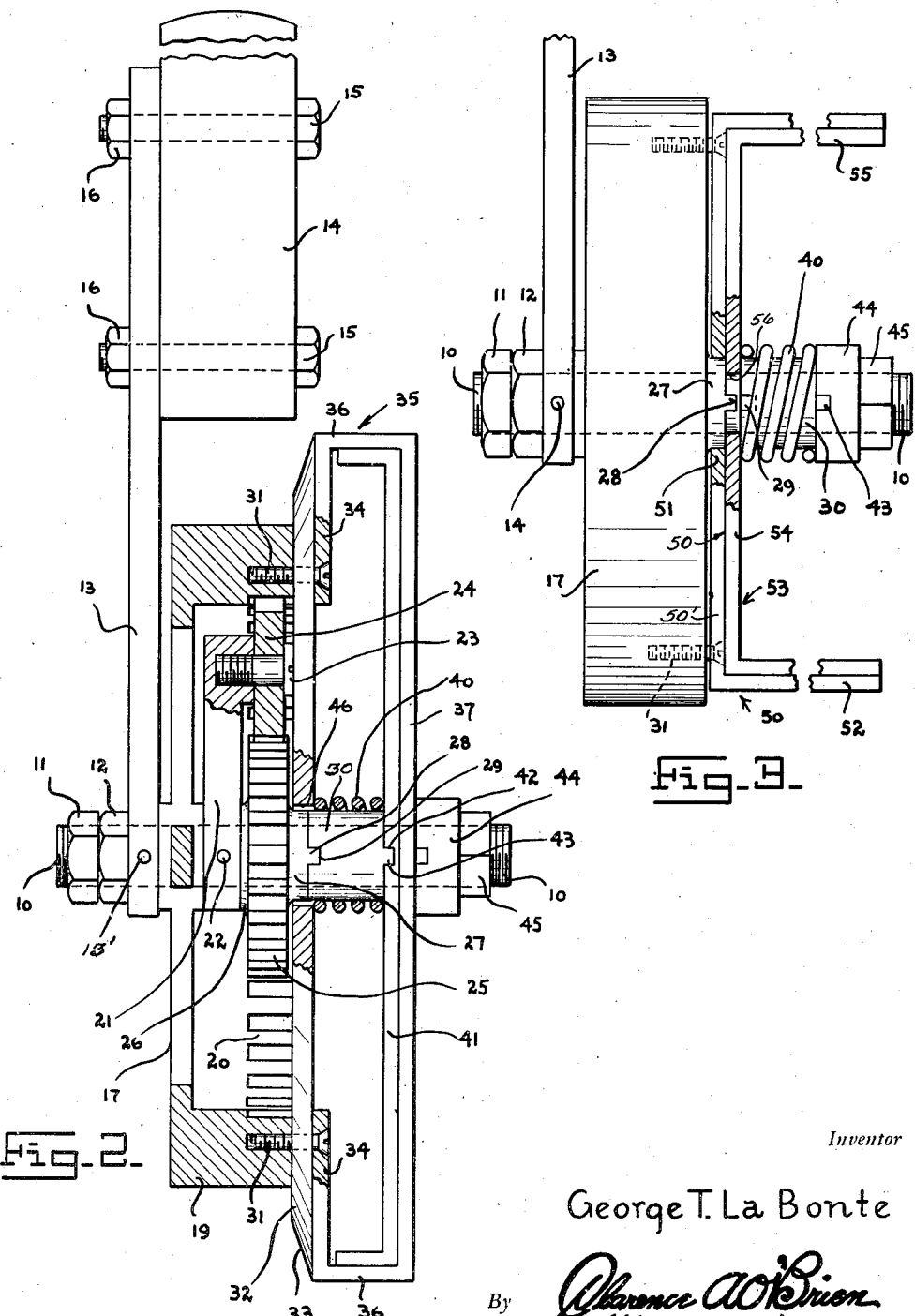

Patented Aug. 9, 1949

2,478,587

UNITED STATES PATENT OFFICE 2,478,587

GRASS EDGING DEVICE

George T. La Bonte, Miami, Fla.

Application July 21, 1945, Serial No. 606,391

1 Claim. (Cl. 56—256)

This invention relates to a grass edging device, and more particularly to such a device adapted for trimming the edges of lawns or the like, where such lawns abut curbings or similar obstructions.

A primary object of this invention is the provision of an improved edging device characterized by a travelling wheel adapted to ride on a curb or similar structure, and having a rotatable blade and a fixed blade associated therewith whereby the edge of the grass may be cut to a desired depth and width away from the edge, in a shearing action.

A further object of the invention is the provision of such a device characterized by a plurality of attachments, where its travelling wheel is adapted to ride to trim other edges not accessible otherwise, whereby the cut may be suitably varied as desired.

Still another object of the invention is the provision of such a device which will be sturdy and durable in construction, reliable and efficient in operation, and relatively simple and inexpensive to manufacture and assemble.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 2 is a sectional view taken substantially along the line 2—2 of Figure 1, certain parts omitted in Figure 1 being disclosed in Figure 2.

Figure 3 is a view similar to Figure 2 but showing certain parts in elevation, and showing certain further alternative parts in position on the apparatus.

Similar reference characters refer to similar parts throughout the several views of the drawings.

Figure 1:
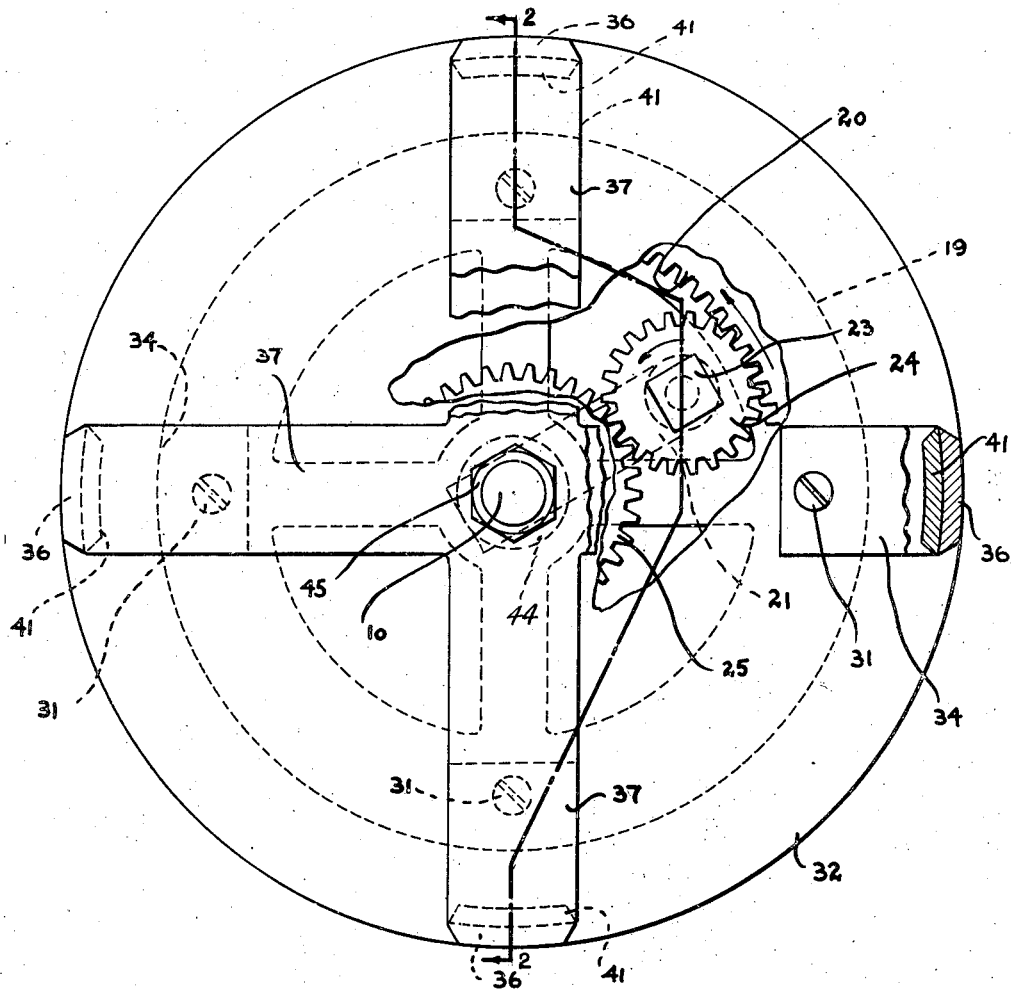
Figure 1 is a side elevational view of one form of device embodying this invention, certain parts thereof being broken away, and certain other parts being indicated in dotted lines.

Having reference now to the drawings, there is disclosed at 10 an axle, having a threaded extremity on which is positioned a nut 11 and a lock nut 12. Secured to the axle inwardly of the lock nut 12 is a radial arm 13 through which extends a tapered pin 13' engaging the axle 10. At the extremity of the arm 13 opposite the axle 10 is a handle 14 which is secured to the arm 13 by means of bolts 15 and nuts 16.

Positioned interiorly of the arm 13 is a wheel 17, rotatable about the axle 10 and provided with a peripheral flange 19, on the interior face of which is positioned an internal ring gear 20.

The axle 10 also carries an arm 21 secured to the axle by means of a tapered pin 22, which arm has secured thereto as by a bolt 23 a cog gear 24 adapted to mesh with the ring gear 20.

A gear 25 is mounted for rotation about the axle 10, and is provided with a spacing collar 26 adapted to offset the gear from the arm 21. The opposite side of the gear 25 carries a spacing collar 27 provided with prongs 28, adapted to engage in suitable recesses 29 in a collar 30 mounted for rotation on the axle 10.

Secured as by screws 31 at suitable spaced points to the flange 19 is a disc 32 having a bevelled edge 33, serving as a guide to the blades of the device, to be more fully described hereinafter. The screws 31 also hold inwardly extending flanges 34 of an outer rotatable blade generally indicated at 35, and including right angled portions 36 connected by an exteriorly positioned transverse portion 37.

The blade 35 and the disc 32 are removable by removal of the screws 31, as will be readily apparent, for a purpose to be more fully described hereinafter.

A coiled spring 40 surrounds the sleeve 30, and abuts the inner surface of an inner rotatable blade 41 having notches 42 therein adapted to receive lugs or prongs 43 carried by the outer extremity of the sleeve 30. Suitable lock nuts 44 and 45 positioned on the opposite threaded extremity of the axle 10 serve to secure the blades in related assembly, the spring 40 biasing the inner blade 41 in close juxtaposition with the transverse portion 37 of the outer blade 35. It may here be pointed out that the disc 32 is provided with a relatively large centrally disposed aperture 46, adapted to surround the hub portion 27 of the gear 25.

From the foregoing the operation of the device should now be readily understandable. The handle 14 which is of any convenient length to facilitate use of the device is grasped, and the wheel 17 positioned on a curb or the like and the device pushed either forwardly or rearwardly, the direction of movement having no effect on the operation thereof. Such rotation of the wheel 17 occasions rotation of the ring gear 20, which in turn through gear 24 rotates the gear 25, which through the prong and sleeve connections previously described rotates the blade 41 in one direction. This blade acts against the outer blade 35 rotating in the opposite direction to effectively cut the grass adjacent the curbing.

As above indicated the disc 32 and the outer blades 34 may be removed readily by removing the screws 31, and correspondingly the lock nuts 44 and 45. Alternative blades may be substituted therefor, for the purpose of increasing the spacing of the cut away from the curb, or conversely to cut the grass flush with the curb or other surface on which the wheel 19 is adapted to ride. Such alternative blades are shown in Figure 3, wherein the outer shear takes the form indicated at 50 of a transversely extending blade 50' provided adjacent opposite ends with apertures into which the screws 31 are adapted to be positioned to enter the flange 19 of the wheel 17. The blade 50' is provided with a suitable central aperture 51 adapted to receive the hub portion 27 of the gear 25, and extending outwardly from opposite ends of the blade are parallel shear arms 52 of any desired length, as for example up to 4 or 6 inches or more. A rotatable inner shear generally indicated at 53 is comprised of a transverse blade 54 having a central aperture 56 for the reception of the axle 10. Opening into the aperture 56 are spaced notches for the reception of prongs or lugs 28 carried by the hub portion 27 of the gear 25. The blade 54 also has at opposite ends outwardly extending parallel shear arms 55 which run against the arms 52 of the blade 50', to effect a shearing action of the grass. When the shears 50 and 53 are positioned, with sleeve 30 on the axle 10, the spring 40 may be placed over sleeve 30 and with the lock nuts 44 and 45 in place on the axle the spring serves to bias the shear 53 inwardly in juxtaposed relation with the shear 50.

The operation of this modification is substantially the same as that of the previously described modification, the distinction residing in the difference of depth and width of the cut.

From the foregoing it will now be seen that there is herein provided an improved edging device adapted to accomplish a variety of purposes, and subject to a wide variety of uses, which accomplishes all the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A lawn edge trimmer comprising an axle, a handle fixed to the axle adjacent one end thereof, a hollow ground contacting drive wheel mounted to rotate on the axle adjacent the handle, a radial arm fixed to the axle within the wheel, an annular row of gear teeth on the inner periphery of the wheel, a pinion mounted on the arm to rotate about an axis parallel with the axis of the axle, the teeth of said pinion meshing with the annular row of teeth on the wheel, a drive gear mounted to rotate on the axle adjacent the arm, the teeth of said drive gear meshing with those of the pinion, a rotary shear mounted to rotate on the axle in spaced relation to the drive gear, means connecting the rotary shear with the drive wheel to cause the shear to rotate in unison with the drive wheel, a cooperating rotary shear mounted on the axle to rotate adjacent the first mentioned rotary shear, means coupling the cooperating rotary shear with the drive gear for rotation in unison therewith, and a compression coiled spring encircling the axle yieldingly to urge the shears into shearing relation to one another.

GEORGE T. LA BONTE.

REFERENCES CITED

The following references are of record in the file of this patent:

UNITED STATES PATENTS

| Number | Name | Date |
| --- | --- | --- |
| 1,883,817 | Olsen et al. | Oct. 18, 1932 |
| 1,992,119 | Campion | Feb. 19, 1935 |

FOREIGN PATENTS

| Number | Country | Date |
| --- | --- | --- |
| 496,570 | Great Britain | Nov. 30, 1938 |